United States Patent [19]

Scozzafava et al.

[11] Patent Number: 5,547,763

[45] Date of Patent: Aug. 20, 1996

[54] ORGANIC NONLINEAR OPTICAL ARTICLE WITH IMPROVED TRANSMISSION ENHANCEMENT LAYER

[75] Inventors: Michael Scozzafava, Rochester; Bradley K. Coltrain, Fairport, both of N.Y.

[73] Assignee: Eastman Kodak Company, Rochester, N.Y.

[21] Appl. No.: 439,075

[22] Filed: May 11, 1995

Related U.S. Application Data

[62] Division of Ser. No. 127,837, Sep. 27, 1993, abandoned.

[51] Int. Cl.⁶ ........................................................ B32B 9/04
[52] U.S. Cl. ........................ 428/447; 385/130; 428/448
[58] Field of Search .................................. 428/412, 448, 428/447; 385/130

[56] References Cited

U.S. PATENT DOCUMENTS 4,946,235  8/1990  Scozzafava et al. ................. 385/130
4,955,977  9/1990  Dao et al. ............................ 385/130

*Primary Examiner*—Christopher Raimund
*Attorney, Agent, or Firm*—Raymond L. Owens

[57] ABSTRACT

Disclosed is a transmission enhancement layer for an organic nonlinear optical article, the layer capable of deflecting light within the article, the layer comprising a polymeric phase having dispersed therein an interwoven network second phase of crosslinked metal oxide having the form —M—O—M— wherein M is a metal atom and O is oxygen, the second phase formed by hydrolysis and condensation of metal alkoxide, the-layer being transparent in the visible and near infrared wavelengths.

17 Claims, 1 Drawing Sheet

ORGANIC NONLINEAR OPTICAL ARTICLE WITH IMPROVED TRANSMISSION ENHANCEMENT LAYER

This is a Divisional of application Ser. No. 08/127,837, filed Sep. 27, 1993, now abandoned.

FIELD OF THE INVENTION

The invention relates to optical articles for the nonlinear propagation of electromagnetic radiation and more particularly, it relates to optical articles having an improved transmission enhancement layer.

BACKGROUND OF THE INVENTION

As disclosed in Scozzafava et al, U.S. Pat. No. 4,946,235 (incorporated herein by reference), nonlinear optics is concerned with the interactions of electromagnetic fields in various media to produce new fields altered in phase, frequency, amplitude, or other propagation characteristics from the incident fields. In order to gain an insight into the origin of nonlinear optical effects, the polarization P induced in a molecule by a local electric field E can be expressed by Equation 1:

$$P = \alpha E + \beta E^2 + \gamma E^3 \quad (1)$$

where

P is the total induced polarization,

E is the local electric field created by electromagnetic radiation, and $\alpha$, $\beta$ and $\gamma$ are the first, second and third order polarizabilities, each of which is a function of molecular properties.

$\beta$ and $\gamma$ are also referred to as first and second hyperpolarizabilities, respectively. The molecular level terms of Equation 1 are first order or linear polarization $\alpha E$, second order or first nonlinear polarization $\beta E^2$, and third order or second nonlinear polarization $\gamma E^3$.

On a macromolecular level, corresponding relationships can be expressed by Equation 2:

$$P = \chi^{(1)} E + \chi^{(2)} E^2 + \chi^{(3)} E^3 \quad (2)$$

where

P is the total induced polarization,

E is the local electric field created by electromagnetic radiation, and $\chi^{(1)}$, $\chi^{(2)}$ and $\chi^{(3)}$ are the first, second and third order polarization susceptibilities of the electromagnetic wave transmission medium. $\chi^{(2)}$ and $\chi^{(3)}$ are also referred to as the first and second nonlinear polarization susceptibilities, respectively, of the transmission medium. The macromolecular level terms of Equation 2 are first order or linear polarization $\chi^{(1)} E$, second order or first nonlinear polarization $\chi^{(2)} E^2$, and third order of second nonlinear polarization $\chi^{(3)} E^3$.

D. J. Williams, "Organic Polymeric and Non-Polymeric Materials with Large Optical Nonlinearities", *Angew. Chem. Int. Ed. Engl.* 23 (1984) 690–703, and Zyss, "Nonlinear Organic Materials for Integrated Optics", *Journal of Molecular Electronics*, Vol. 1, pp. 25–45, 1985, disclose a variety of nonlinear optical end uses that can be served by utilizing $\chi^{(2)}$ or $\chi^{(3)}$ properties of a propagation medium.

Interest in nonlinear optical devices has particularly centered on devices relying on second order polarization susceptibilities. To achieve on a macromolecular level second order polarization ($\chi^{(2)} E^2$) of any significant magnitude, it is essential that the transmission medium exhibit second order (first nonlinear) polarization susceptibilities, $\chi^{(2)}$, greater than $10^{-9}$ electrostatic units (esu). To realize such values of $\chi^{(2)}$, it is necessary that the first hyperpolarizability $\beta$ be greater than $10^{-30}$ esu.

A significant difficulty encountered finding suitable molecular dipoles for second order polarization effects lies in the molecular requirements that must be satisfied to achieve usefully large values of $\beta$. For a molecule to exhibit values of $\beta$ greater than zero, it is necessary that the molecule be asymmetrical about its center—that is, noncentrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies).

For $\chi^{(2)}$ to exhibit a usefully large value, it is not only necessary that $\beta$ be large, but, in addition, the molecular dipoles must be aligned so as to lack inversion symmetry. The largest values of $\chi^{(2)}$ are realized when the molecular dipoles are arranged in polar alignment, e.g., the alignment obtained when molecular dipoles are placed in an electric field.

Second order polarization ($\chi^{(2)} E^2$) has been suggested to be useful for a variety of purposes, including optical rectification (converting electromagnetic radiation input into a DC output), generating an electro-optical (Pockels) effect (using combined electromagnetic radiation and DC inputs to alter, during their application, the refractive index of the medium), phase alteration of electromagnetic radiation, and parametric effects, most notably frequency doubling, also referred to as second harmonic generation (SHG).

For a number of years, the materials employed for achieving second order polarization effects were non-centrosymmetric inorganic crystals, such as potassium dihydrogen phosphate and lithium niobate. Williams postulates mathematically and experimentally corroborates second order polarization susceptibilities in organic dipoles equaling and exceeding those of conventional inorganic dipoles.

A number of difficulties have been encountered in attempting to prepare efficient optical devices employing an organic layer for the nonlinear propagation of electromagnetic radiation. If optical transmission is attempted through the organic layer while its lower surface is in direct contact with an electrode or other electrical conductor, significant optical losses are incurred. An optically passive layer, commonly referred to as a buffer layer or transmission enhancement layer, under the organic layer has been suggested to enhance transmission efficiency. Such arrangements are disclosed by Ulman et al U.S. Pat. No. 4,792,208, for example.

There are several difficulties involved. First, common inorganic deposition techniques, such as sputtering, molecular beam epitaxy, chemical vapor deposition, and the like, produce comparatively thin layers that are optically inefficient in reducing electromagnetic energy losses.

While there are varied techniques available for the deposition of thicker organic buffer layers beneath optically active layers, these layers are susceptible to degradation during formation of high $\chi^{(2)}$ poled polymeric films as nonlinear optical layers. A typical technique for forming a high $\chi^{(2)}$ poled polymeric film entails solvent casting followed by heating the polymeric film above its glass transition temperature, usually well in excess of 50° C., while applying a potential bias to achieve electrical field alignment of organic molecular dipoles contained in the polymeric film. Both the solvents employed for casting and the elevated temperatures employed for poling can degrade the underlying buffer layer.

J. I. Thackera, G. F. Lipscomb, M. A. Stiller, A. J. Ticknor and R. Lytel, "Poled Electro-Optic Waveguide Formation in Thin-Film Organic Media", Appl. Phys. Lett. 52 (13), Mar. 28, 1988, pp. 1031–1033, and, by the same authors, "Organic Electro-Optic Waveguide Modulators and Switches" SPIE Vol. 971 Nonlinear Optical Properties of Organic Materials (1988), pp. 218–229, are examples of attempts to use organic buffer layers in combination with organic nonlinear optical propagation layers.

Metal fluorides and oxides have been employed with optical articles, such as lenses. Mathers et al U.S. Pat. No. 2,441,668, Socha U.S. Pat. No. 3,176,575 and Hoffman U.S. Pat. No. 3,883,214 are illustrative. Further, Landry et al U.S. Pat. No. 5,051,298 (incorporated herein by reference) commonly assigned, disclose producing a free standing, optically clear, poly(acrylate) or poly(methacrylate) film having dispersed therein silica produced in situ from an alkoxysilane.

RELATED PATENT APPLICATIONS

Brazas et al, U.S. Pat. No. 4,948,216, commonly assigned, disclose depositing on a support an optical conduction layer of a low molecular weight organic compound having a glass transition temperature above about 50° C. In one form, an overlying portion of the layer has a differing refractive index than the underlying portion and is patterned to form an optical element.

Scozzafava et al, U.S. Pat. No. 4,946,235, commonly assigned, disclose the formation of an optical article by employing an amorphous low molecular weight organic compound as a transmission enhancement layer over an organic layer for the nonlinear transmission of electromagnetic radiation.

Rider et al, U.S. Pat. No. 4,948,225, commonly assigned, disclose the use of metal fluoride and oxide layers of thicknesses of less than 0.1 μm between a conductive layer containing a metal of a moderate work function and poled polymeric medium having a glass transition temperature of at least 50° C.

Schildkraut et al, U.S. Pat. No. 4,971,426, commonly assigned, disclose an optical article intended for modulation of reflected electromagnetic radiation comprised of a prism support onto which are formed in sequence (a) a layer formed of at least one of a metal fluoride or oxide and a low molecular weight aromatic compound, (b) a negative dielectric constant layer, (c) a layer exhibiting a change in its refractive index as a function of a potential bias impressed upon it, and (d) an electrode.

Dao et al, U.S. Pat. No. 4,955,977 disclose a nonlinear optical article with improved buffer layer comprising a mixture of at least one metal oxide or fluoride and a low molecular weight aromatic compound.

However, there is still a great need for an improved transmission enhancement layer that can be applied to an organic nonlinear optical article to improve the electrooptic coefficient of the polymeric film constituting the nonlinear optical article without degradation, for example, from solvents used in the formulation of the transmission enhancement layer. Further, there is a need to improve the poled polymeric layer by utilizing a buffer layer resistant to solvents in said polymeric layer.

SUMMARY OF THE INVENTION

One aspect of this invention is directed to an optical article for the propagation of electromagnetic radiation comprised of an electrically conductive support, a poled polymeric film located on the support exhibiting a glass transition temperature of at least 50° C. and a second order polarization susceptibility greater than $10^{-9}$ electrostatic units, and a transmission enhancement layer interposed between said conductive support and said polymeric film.

The optical article is characterized in that the transmission enhancement layer is an amorphous layer of at least 0.5 μm in thickness having a refractive index less than that of the polymeric film and a resistance less than 10 times that of the polymeric film. The improved transmission enhancement layer is comprised of a mixture of (a) at least one metal oxide or fluoride and (b) a polymeric medium.

More specifically, the improved transmission enchancement layer is comprised of a polymer phase having dispersed therein an interwoven network second phase of crosslinked metal oxide having the form —M—O—M— wherein M is a metal atom and O is oxygen, the second phase formed by hydrolysis and condensation of metal alkoxide, the coating being transparent in the visible and near infrared wavelengths.

It has been discovered that when employing (a) and (b) in combination, as more specifically described below, a combination of advantages are realized. First, a smooth layer of a thickness appropriate for reducing optical losses from an overlying nonlinear optical propagation layer can be realized, whereas this has not been successfully achieved employing only inorganic metal oxides or fluorides. Second, the combination of (a) and (b) provides a layer that is stable under the stringent conditions of poling at temperatures of 50° C. or higher, whereas attempts to form transmission enhancement layers as underlayers containing (b) alone have been unsuccessful. Third, by employing (a) and (b) in combination, a range of varied refractive indices for the transmission enhancement layer can be realized. This permits the refractive index of the transmission enhancement layer to be adjusted in relation to that of the poled polymeric layer to achieve more efficient optical propagation. Fourth, formulating (a) and (b) in combination using hydrolysis and condensation of metal alkoxide provides buffer layers more resistant to solvents used in formulating the poled polymeric layer, thereby providing greater latitude in formulating the poled polymeric layer.

DESCRIPTION OF THE PREFERRED EMBODIMENTS

The invention is applicable to the propagation of electromagnetic radiation in the wavelength ranges commonly encountered by nonlinear optical articles, e.g., wavelengths ranging from the near ultraviolet, typically 300 to 400 nm, through the visible of 400 to 700 nm and well into the infrared up to wavelengths of 2.0 μm or more. The optical articles of the invention are particularly useful with solid state lasers providing input wavelengths in the range from about 550 to 1500 nm. Second harmonic wavelengths internally generated are, of course, half the input radiation wavelengths.

Figure 1:
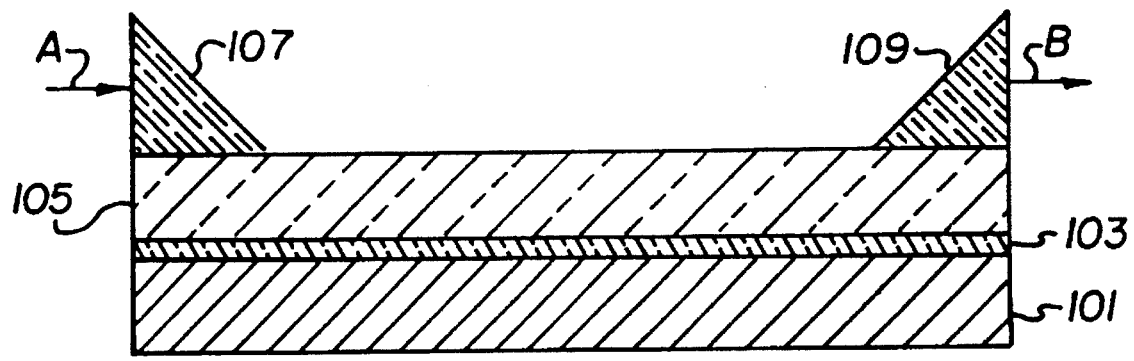
FIG. 1 is a schematic view of one embodiment of a nonlinear optical device according to the invention.

In FIG. 1, an optical article 100 capable of the nonlinear transmission of electromagnetic radiation is shown. Electromagnetic radiation is supplied to the device, as indicated at A, and exits from the device, as indicated at B, with an internally generated second harmonic of the frequency of the electromagnetic radiation supplied contained as a component of the output electromagnetic radiation.

The optical article is comprised of an electrically conductive support 101, which can also function as a poling electrode. On the conductive support is formed a transmission enhancement layer 103 satisfying the requirements of the invention. A poled polymeric film 105 exhibiting a glass transition temperature of at least 50° C. (preferably at least 80° C.) and a high (greater than $10^{-9}$ esu) second order polarization susceptibility or $\chi^{(2)}$ is coated over the transmission enhancement layer. A prism 107 is positioned on the polymer film to introduce electromagnetic radiation into the film. A prism 109 is positioned on the polymeric film to receive electromagnetic radiation from the polymeric film.

Figure 2:
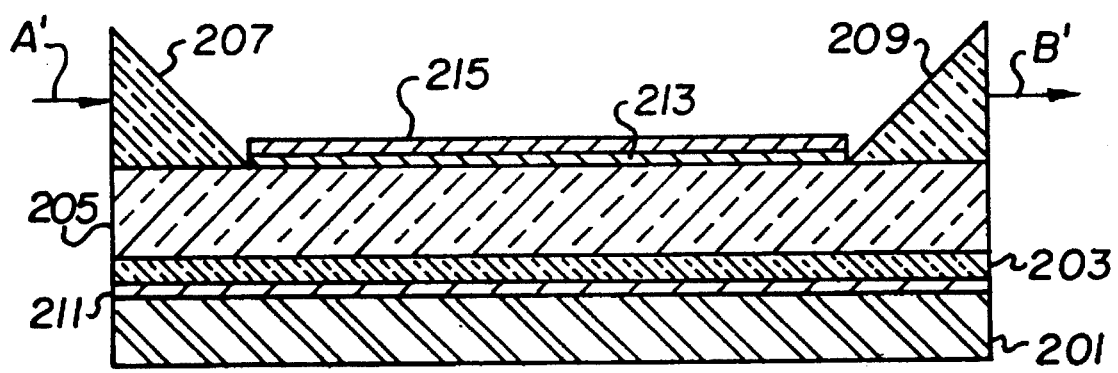
FIG. 2 is a schematic view of a preferred embodiment of a nonlinear optical device according to the invention.

In FIG. 2, an optical article 200 is shown which functions in the same manner as device 100. Electromagnetic radiation, indicated at A', is received by the device and exits the device as indicated at B', similarly as electromagnetic radiation B. Prisms 207 and 209 perform the same functions as prisms 107 and 109. Any or all of the prisms can be replaced by an alternative optical coupling means, such as an optical grating or a waveguide (e.g., an optical fiber).

Optical article 200 is constructed with an electrically insulative support 201 and a conductive metal layer 211 together forming a poling electrode. Transmission enhancement layer 203 and polymeric film 205 can be similar to layer 103 and film 105, described above. Onto the polymeric layer 205 is coated a second buffer layer 213 onto which is deposited a second poling electrode 215.

The optical articles 100 and 200 are fabricated by slightly different poling techniques. In constructing both devices, after the transmission enhancement layer is formed on the underlying poling electrode, the polymeric film containing organic molecular dipoles, either as an integral part of a polymer or blended with a polymer, is formed over the transmission enhancement layer. While any convenient conventional deposition technique can be employed, the most common deposition technique is solvent casting accompanied by spinning to obtain a smooth polymeric film of uniform thickness. As originally deposited, the organic molecular dipoles are essentially randomly oriented, resulting in a film lacking the non-centrosymmetric orientation of the organic molecular dipoles required for realizing high $\chi^{(2)}$ values.

To achieve $\chi^{(2)}$, it is necessary to heat the film to a temperature above its glass transition temperature so that the organic molecular dipoles can have the mobility required for alignment. Next, an electrical field gradient is applied across the polymeric layer.

In constructing optical article 100, a single poling electrode is used to apply the electrical field gradient across the polymeric film while it is heated above its $T_g$. A corona electrode (not shown) which forms no part of the completed device is positioned above and spaced from the polymeric film. By applying a potential difference between the corona electrode and the poling electrode, a corona discharge above the polymeric film creates a surface charge on the polymeric film that acts as a counter-electrode for poling. The molecular dipoles align themselves with the electrical field gradient in the polymeric film. By continuing the electrical bias across the electrodes while cooling the polymeric film back to ambient temperatures and below its glass transition temperature, the organic molecular dipoles are immobilized in their field aligned or poled arrangement.

In constructing optical article 200, the overlying buffer or transmission enhancement layer 213 and second poling electrode 215 are formed over the polymeric layer before poling. By subsequently heating the polymeric layer above its $T_g$ and applying a potential difference between the layers 211 and 215, poling can be achieved with two electrodes similarly as poling is achieved with a single electrode, as described above.

In preparing the optical articles and in their use, the transmission enhancement layers perform useful and advantageous functions. In use, when electromagnetic radiation is being propagated in the poled polymeric film, it is not entirely confined to this film. If the polymeric film is in direct contact with an electrical conductor, such as a poling electrode, a significant portion of the electromagnetic radiation energy is dissipated within the device. To prevent this from occurring, the dielectric transmission enhancement layers must be at least 0.5 µm in thickness, preferably at least 1 µm in thickness. The transmission enhancement layers are also preferably constructed of a lower refractive index than the polymeric layer. This favors internally reflecting most of the electromagnetic radiation impinging on the enhancement transmission layers from the polymeric film.

The minimum thicknesses of the transmission enhancement layers are established to contain the entering electromagnetic wavefront and minimize electromagnetic energy losses.

Notwithstanding their protective utility, the transmission enhancement layers are preferably limited in thickness to ranges that improve optical performance, typically less than 10 µm and preferably less than 5 µm. The reason for limiting the thickness of the transmission enhancement layers is that these layers constitute a resistance in series with the polymeric film during poling. It is desired to have a significant voltage drop within the polymeric film during poling to align the organic molecular dipoles. If the resistance of the transmission enhancement layer is too large in relation to that of the polymeric film during poling, most of the voltage gradient applied across the electrodes will appear in the transmission enhancement layer rather than in the polymeric film where it is needed for organic molecular dipole alignment. Therefore, it is contemplated that the transmission enhancement layers have resistances less than 10 times (preferably less than 5 times) that of the polymeric film when heated above its glass transition temperature. The electrical resistance of the transmission enhancement layers can be kept low by a combination of limiting their thickness and their resistivity.

Failures to achieve optically clear transmission enhancement layers corresponding to layers 103 and 203 in the optically required thicknesses using inorganic materials led to attempts to form these layers with organic materials. It was found that organic layers greater than 0.5 µm in thickness could be readily formed. Unfortunately, the stringent conditions imposed by poling, including both the adverse effects of casting solvents and elevated temperatures, severely degraded organic layers.

The present invention is based upon the discovery that a blend of (a) at least one metal fluoride or oxide and (b) a polymeric medium is capable of producing smooth layers in the required thickness ranges as well as layers that resist degradation at poling temperatures well above 50° C. In fact, the transmission enhancement layers of this invention have shown acceptable stability of poling temperatures well above 100° C. and, by proper choice of ingredients, can provide stable coatings throughout common organic polymer poling temperature ranges, e.g., 150° C.

It is preferred to employ one or more metal fluorides or oxides in combination with a film forming polymeric compound (having a molecular weight of at least 5000) in weight ratios of (a):(b) from 20:80 to 90:10 (preferably 50:50 to 80:20). The (a) and (b) components together produce smooth amorphous coatings that serve as excellent substrates for spin casting or otherwise depositing uniform polymeric films. The coatings remain stable under the casting and poling conditions required to form the poled polymeric films. Additionally, the diversity of materials from which (a) and (b) can be selected and the available variance of their proportions facilitates tailoring the refractive indices of the layers containing (a) and (b) in relation to the refractive index of the poled polymeric layer for optimum optical performance.

By "amorphous" as used herein, it is meant that there is substantially no crystallinity in the layer or microstructure attributed to the coating process. This can be determined by visual inspection or use of a microscope; by Raman spectroscopic techniques; or by the observation of scattered light from the waveguide or device.

Polymeric materials that are useful are solids at room temperature. They preferably have a glass transition temperature of greater than about 50° C. Glass transition temperature is measured using conventional techniques, such as differential scanning calorimetry. The measurement should be taken from amorphous bulk material that is substantially free from residual solvents and decomposition products since that is the condition of the materials when they are vacuum coated.

The (a) component of the transmission enhancement layers, individual or mixed metal fluorides, individual or mixed metal oxides, or mixtures of metal fluorides and metal oxides, can be chosen from a wide range of stable metal oxides and fluorides. Alkaline earth oxides (particularly magnesia), rare earth oxides, alumina, and silica constitute preferred metal oxides for use in the practice of this invention. However, any stable metal oxide that can be readily deposited in an amorphous form using hydrolysis and condensation can be employed. Alkali metal fluorides (e.g., lithium fluoride) and alkaline earth metal fluorides (e.g., calcium or magnesium fluoride) constitute preferred metal fluorides. Rare earth fluorides are also contemplated. Mixed metal oxides, mixed metal fluorides, and mixtures of metal fluorides and oxides are all contemplated. Mixtures offer the advantage of increasing steric disorder, thereby suppressing crystallization and preserving the desired amorphous nature of the coating.

In a preferred aspect of the invention, the (a) component of the transmission enhancement layer can be formed in situ with the (b) component to provide a transmission enhancement layer comprised of a polymeric phase having dispersed therein an interwoven or interpenetrated network second phase of crosslinked metal oxide having the form —M—O—M— wherein M is a metal atom and O is oxygen. The second phase can be formed by hydrolysis and condensation of a metal alkoxide. Such layer is transparent in the visible and near infrared wavelengths. The crosslinked metal oxide may be selected from $SiO_2$, $TiO_2$, $Al_2O_3$, $ZrO_2$, $CeO_2$, $SnO_2$, $PbO_2$, $V_2O_5$, $Ta_2O_5$ and $P_2O_3$ or combinations of such oxides, with the preferred crosslinked metal oxide being $SiO_2$ which would be present in the form —Si—O—Si—. Forming the buffer layer in accordance with this aspect of the invention results in two separate phases. One phase which is component (b) is the polymeric phase and the second phase which is component (a) is the metal oxide phase. The second phase is comprised of an interpenetrating or interwoven network of crosslinked —M—O—M—, e.g., —Si—O—Si—. The crosslinked —M—O—M— can have substantial residual Si—OH groups, for example, up to about 50% of the Si can contain OH groups. These OH groups could provide hydrogen bonding to the polymer which retards separation of the phases. Briefly, for $SiO_2$, the second phase or component (a) can be formed by hydrolysis and condensation as follows.

$$Si(OCH_2CH_3)_4 + H_2O \xrightarrow{hydrolysis} SiOH + CH_3CH_2OH$$

$$SiOH + SiOH \xrightarrow{condensation} -Si-O-Si- + H_2O$$

$$-SiOH + SiOR \xrightarrow{or} -Si-O-Si- + ROH$$

where R is $CH_3CH_2$, for example.

$SiO_2$ is particularly suitable for formation as —Si—O—Si— in a polymeric organic acrylate binder such as poly(acrylate) or poly(methacrylate). Thus, in this aspect of the invention a poly(acrylate) or poly(methacrylate) have been formed having substantially uniformly dispersed therein silicon oxide.

The silicon oxide phase in the buffer layer has been produced in a solution of the polymer by hydrolysis and condensation of a tetraalkoxysilane, for example, tetraethoxysilane.

Buffer or transmission enhancement layers have been made using poly(methyl methacrylate), herein designated by the acronym PMMA. Similar layers can be made using other polymers of lower alkyl esters of acrylic, or methacrylic acid. The term "lower alkyl" means alkyl radicals of from one to about four carbon atoms.

Polymers of straight chain lower alkyl acrylates and methacrylates are preferred; however, polymers of branched esters such as isopropyl-, sec-butyl-, and tert-butylmethacrylate and acrylates can be used, if desired. The acrylates and methacrylate polymers used need not be homopolymers. Thus, the polymers may contain small amounts of modifying acrylate and/or methacrylate.

The polymers may be block copolymers. For example, the polymers may be methyl methacrylate/-ethyl acrylate copolymers, methyl methacrylate/butyl methacrylate copolymers, and methyl methacrylate/-methyl acrylate, or methyl methacrylate/butyl acrylate copolymers. Mixtures of such polymers can be employed.

For the process of this invention, a poly(acrylate), or poly(methacrylate), is dissolved in a solvent. Preferably, the concentration of the polymer in the solvent is in the range of from about 1.0 to about 50 wt. %; more preferably from about 5 to about 25 wt. %. The relative amounts of solvent and polymer are not critical, and concentrations somewhat outside the range of 1–50% can be used, if desired.

Solvents selected for use in this invention have sufficient solvent power for the polymer(s) and alkoxysilane(s) used in the compositions, to afford solutions having the desired solute concentrations. Secondly, applicable solvents are inert, or substantially inert, toward the other ingredients present, under the conditions employed in the buffer layer forming process. Thirdly, the solvents are miscible with water, to the extent necessary to prevent phase separation when the polymer/solvent/alkoxysilane mixture is admixed with the water acid catalyst mixture, and/or the water produced by the condensation of silanol groups in the hydrolyzed alkoxysilane. Fourthly, the solvents are relatively low boiling, and have a fairly high volatility, so that they can be fairly readily removed by the curing step discussed below. In addition, the solvents should be selected to have substantially no dissolution effect on the poled polymeric film so as to avoid degradation of not only the poled polymeric film but also the underlying buffer layer if penetration of the relatively thin poled polymeric film results.

For purposes of providing an improved nonlinear optical article using these improved buffer layers, treatment of successive layers is very important, particularly, prior to applying an overcoat or next layer. Thus, after applying each layer it is important to remove residual solvent therefrom prior to applying further layers. This may be best accomplished by vacuum baking the layer at up to the glass transition temperature of the polymer.

Solvents should be selected for forming the poled polymeric film that are poor solvents for the polymeric material contained in the buffer or transmission enhancement layer. Solvents having the following properties are useful for the buffer layer:

(1) can dissolve 1–50 wt. % or more of the polymer or mixture of polymers used;

(2) can dissolve or be miscible with said alkoxysilane;

(3) are reasonable miscible with up to about 4 moles of water, based on the moles of alkoxysilane;

(4) have a boiling point (STP) less than about 160° C.; and (5) are substantially inert with respect to the polymeric film containing the molecular dipoles.

Applicable solvents are exemplified by tetrahydrofuran, dioxane, acetone, methyl ethyl ketone, methly acetate, ethyl acetate, dichloromethane, N,N-dimethylformamide, trichloropropane, dimethylacetamide, propylene glycol monoethyl ether acetate and other amides, ethers, ketones, esters, and halogenated hydrocarbons, and other materials having the properties discussed above. Thus, the solvent must be suitable for dissolving and coating the buffer or transmission enhancement layer without dissolving the nonlinear optical layer. Accordingly, it will be seen that such requirement severely limits the selection of solvents.

There is no critical aspect pertaining to the mixing of the polymer and solvent. The polymer/solvent mixture can be stirred if desired to facilitate solution. Likewise, the mixture can be warmed to enhance the rate of solution. The polymer can be added to the solvent before, or at the same time, or after the alkoxysilane is added to the solvent.

The alkoxysilanes used have the formula $Si(OR)_4$, wherein each R is alike or different, and is selected from the class consisting of lower alkyl radicals, i.e., alkyl radicals having up to about four atoms. Of these, tetraethylorthosilicate and tetramethylorthosilicate are preferred. These materials are used in the starting composition in an amount sufficient to yield from about 10 to about 65 wt. % (calculated as $SiO_2$) of the final film composition. Concentrations somewhat outside this range can be employed.

For this invention, the solvent/polymer/-tetralkoxysilane mixture is treated with a stoichiometric amount of water (4 moles of water per mole of alkoxide) or a substantially stoichiometric amount. For the purpose of this invention, a "substantially stoichiometric" amount means a stoichiometric amount, plus or minus the amount of water within the normal processing error. In many instances, the substantially stoichiometric amount is the stoichiometric amount, plus or minus about 10% by weight. Preferably, the water contains the acid catalyst. A 0.0001 to 2.5 molar solution of acid, preferably 0.10 to 1.25 molar, can be employed. Hydrochloric acid or other volatile acid such as acetic acid, propionic acid, and the like can be used. Hydrochloric acid is preferred.

Acid catalysis is preferred over base catalysis. Buffer layers made from base catalyzed material tend to be opaque. Also buffer layers made by acid catalysis have a higher glass transition temperature than buffer layers made by using base catalysis. Base-catalyzed buffer layers tend to have a greater amount of residual tetraethylorthosilicate than the acid-catalyzed material.

After the water and catalyst have been added to the solvent/polymer/alkoxysilane mixture, the resultant material is thoroughly mixed. Mixing can be conducted at ambient temperature or at a temperature slightly below or above ambient, e.g., 10° C. to about 35° C. This range is not critical, and temperatures somewhat outside this range can be employed. Mixing is usually conducted for from 3 to about 24 hours, preferably 10 to 20 hours.

After mixing, the resultant solution is coated below or on top of the poled polymeric layer as noted herein with spin coating being preferred.

To prepare an optically clear (i.e., transparent) buffer layer, the coating solution is applied (in a system open to the atmosphere, i.e., not in a closed mold) to the electrode surface or to the surface of the poled polymeric film.

For purposes of the invention, it is important that the rate of solvent removal be slow enough to prevent bubble formation. Bubbles have an adverse effect on the films, e.g., they detract from the optical clarity and uniformity. Thus, preferably, the buffer layer can be first dried at about 30°–35° C. for about 0.25 to 2 hours. Thereafter, it is preferably cured under a vacuum in the range of 5 to 50 mili Torr at a temperature of from about 60° C. to about 200° C. for from about 1 to 10 days. Preferred curing temperatures are in the range of from about 90° C. to 150° C.

It is to be understood that there is no real lower limit on the curing temperature. Lower temperatures merely require longer cure times.

To prevent bubble formation, temperature at or near the solvent boiling point should not be used when there is an appreciable amount of solvent remaining in the film composition. However, temperatures about or approaching, or somewhat above the solvent boiling point can be used near the end of the curing period. Thus, it is not necessary to use the same temperature throughout the curing period. Different temperatures, e.g., a stepwise or continually increasing temperature rate during the curing period may be used. The rate of temperature increase need not remain constant; thus, a faster rate may be used during a later phase of the curing step, if desired.

Although not bound by any theory, the properties and morphology of the films of this invention appear to be largely dependent upon (a) the pH at which the hydrolysis/condensation is conducted, and (b) the rate of curing. In the composition of this invention, low molecular weight alkoxides are converted to an $SiO_2$ network. This process is occurring within a polymeric, glassy matrix, e.g., PMMA. Initially, the $T_g$ of the system is low due to the presence of solvent molecules which plasticize the polymer, and the polymerization of the inorganic network proceeds rapidly.

During hydrolysis and condensation of the alkoxide, several reactions in these processes can occur simultaneously. The relative rates of some or all of these reactions is pH dependent. Hence, the pH will greatly affect the overall result obtained from the chemical transformations, and therefore, influence the composition of the silica phase produced. Therefore, it is important to use an acidic hydrolysis/condensation media.

The coating and curing temperatures also influence the thermodynamic and kinetic factors involved in the hydrolysis and condensation processes. Furthermore, these temperatures affect the rate of solvent evaporation. The coating temperature will have an effect on the particular silica morphology produced. The curing temperatures will increase the extent of reaction of the inorganic phase, without substantially altering the particle morphology.

Buffer layers of this invention may contain silica that is not fully densified. The composition of the silica in the buffer layers comprising the silica phase may not conform exactly to the formula $SiO_2$. For example, when silicate networks are produced in situ in polymers such as PMMA, studies have shown $SiO_2$ domains to be on the order of 35–100 Angstroms in size. Thus, the small domain size of the highly dispersed phase produces highly transparent buffer layers with very little scatter.

The electrode metals can take any convenient conventional form. It is common to employ noble metals, particularly gold, to provide poling electrodes or at least electrode poling surfaces. Preferred poling electrode metals are those having work functions in the range of from 3.5 to 4.5 eV. Silver is a particularly useful poling electrode metal, although a variety of other materials, such as indium tin oxide, copper and aluminum also find wide use.

Any conventional high $\chi^{(2)}$ poled polymeric film can be utilized which provides an immobilizing matrix for the organic molecular dipoles at ambient or near ambient temperatures, but requires heating to at least 50° C. (preferably 80° C.) to effect poling, as noted above. The poled polymeric media of Ulman et al and Robello et al, cited above, are specifically contemplated as well as Robello European Patent Application No. 0,313,477, published Apr. 26, 1986, and Scozzafava et al U.S. Pat. No. 4,886,339, commonly assigned.

Specifically preferred organic nonlinear optical layers are those which can be formed by poling linear condensation and vinyl polymers including non-centrosymmetric molecular dipoles as pendant or backbone groups. The molecular dipoles include an electron donor moiety, such as an amino, oxy, or thio group, linked through a conjugated π bonding system to an electron acceptor moiety, such as a sulfonyl, cyano or nitro group to permit oscillation of the molecular dipole between a lower polarity ground state and a higher polar excited state. A preferred conjugated π bonding system is provided by a 4,4'-stilbene or 4,4'-diazobenzene linkage between the electron acceptor or electron donor moiety. The molecular dipole can be linked to the polymer backbone through the electron donor or acceptor moiety or incorporated in the polymer backbone by linkages through both the electron acceptor and donor moieties.

The following are illustrative of preferred molecular dipole monomers suitable for producing condensation polymers that can be poled to form the nonlinear optical layers.

TABLE IV

| | |
|---|---|
| NOCM-1 | 4'-{N-[Methoxycarbonyl)pentyl]-N-methyl-amino}-4-(6-hydroxyhexyl)sulfonylazobenzene |
| NOCM-2 | 4'-{N-(5-[Buthoxycarbonyl)pentyl]-N-methyl-amino}-4-(6-hydroxyhexyl)sulfonylazobenzene |

TABLE IV-continued

| | |
|---|---|
| NOCM-3 | 4'-{N-(5-[Methoxycarbonyl)pentyl]-N-methyl-amino}-4-(6-hydroxyhexyl)sulfonylstilbene |
| NOCM-4 | 4'-{N-[Buthoxycarbonyl)pentyl]-N-methyl-amino}-4-(6-hydroxyhexyl)sulfonylstilbene |
| NOCM-5 | 4'-[N-(Methoxycarbonyl)methyl-N-methylamino]-4-(6-hydroxyhexyl)sulfonylazobenzene |
| NOCM-6 | 4'-[N-(Ethoxycarbonyl)methyl-N-methylamino]-4-(6-hydroxyhexyl)sulfonylazobenzene |
| NOCM-7 | 4'-[N-(Methoxycarbonyl)methyl-N-methylamino]-4-(6-hydroxyhexyl)sulfonylstilbene |
| NOCM-8 | 4'-[N-(Ethoxycarbonyl)methyl-N-ethylamino]-4-(6-hydroxyhexyl)sulfonylstilbene |
| NOCM-9 | 4'-[N-(6-Hydroxyhexyl)-N-methylamino]-4-[2-(methoxy-carbonyl)ethyl]sulfonylazobenzene |
| NOCM-10 | 4'-[N-(6-Hydroxyhexyl)-N-methylamino]-4-[2-(ethoxy-carbonyl)ethyl]sulfonylazobenzene |
| NOCM-11 | 4'-[N-(6-Hydroxyhexyl)-N-methylamino]-4-[2-(methoxy-carbonyl)ethyl]sulfonylstilbene |
| NOCM-12 | 4'-[N-(6-Hydroxyhexyl)-N-methylamino]-4-[2-(ethoxy-carbonyl)ethyl]sulfonylstilbene |
| NOCM-13 | 4'-[N-(2-Hydroxyethyl)-N-methylamino]-4-[2-(methoxy-carbonyl)ethyl]sulfonylazobenzene |
| NOCM-14 | 4'-[N-(2-Hydroxyethyl)-N-methylamino[-4-[2-(ethoxy-carbonyl)ethyl]sulfonylazobenzene |
| NOCM-15 | 4'-[N-(2-Hydroxyethyl)-N-methylamino]-4-[2-(methoxy-carbonyl)ethyl]sulfonylstilbene |
| NOCM-16 | 4'-[N-(2-Hydroxyethyl)-N-methylamino]-4-[2-(ethoxy-carbonyl)ethyl]sulfonylstilbene |
| NOCM-17 | 4'-[N-(2-Hydroxyhexyl)-N-methylamino]-4-[5-(methoxy-carbonyl)pentyl]sulfonylazobenzene |
| NOCM-18 | 4'-[N-(2-Hydroxyhexyl)-N-methylamino]-4-[5-(methoxy-carbonyl)pentyl]sulfonylstilbene |
| NOCM-19 | 4'-(4-Hydroxy-1-piperidiny)-4-[2-(methoxycarbonyl)-ethyl]sulfonylazobenzene |
| NOCM-20 | 4'-(4-Hydroxy-1-piperidinyl)-4-[2-(methoxycarbonyl)-ethyl]sulfonylstilbene |

The following are illustrative of preferred molecular dipole members suitable for producing vinyl polymers that can be poled to form the nonlinear optical layers.

TABLE V

| | |
|---|---|
| NOVM-1 | 4'-[N-(2-acryloyloxyethyl-N-methylamino]-4-methyl-sulfonylstilbene |
| NOVM-2 | 4'-[N-(2-methacryloyloxyethyl-N-methylamino]-4-methyl-sulfonylstilbene |
| NOVM-3 | 4'-[N-(6-acryloyloxyhexyl-N-methylamino]-4-methyl-sulfonylstilbene |
| NOVM-4 | 4'-[N-(6-methylacryloyloxyhexyl)ethylamino]-4-methyl-sulfonylstilbene |
| NOVM-5 | 4'[-4-acryloyloxy-1-piperidyl-4-methylsulfonyl-stilbene |
| NOVM-6 | 4'[-4-methacryloyloxy-1-piperidyl-4-methyl-sulfonyl-stilbene |
| NOVM-7 | 4'-[N-(2-acryloyloxyethyl)-N-methylamino]-4-phenyl-sulonylstilbene |
| NOVM-8 | 4'-[N-(2-methacryloyloxyethyl)-N-methylamino]-4-phenylsulfonylstilbene |
| NOVM-9 | 4'-[N-(6-acryloyloxyhexyl)-N-methylamino]-4-phenyl-sulfonylstilbene |
| NOVM-10 | 4'-[N-(6-methacryloyloxyhexyl)-N-methylamino]-4-phenylsulfonylstilbene |
| NOVM-11 | 4'[-4-acryloyloxy-1-piperidyl-4-phenylsulfonyl-stilbene |
| NOVM-12 | 4'[-4-methacryloyloxy-1-piperidyl-4-phenyl sulfonyl-stilbene |
| NOVM-13 | 4'-[N-(2-acryloyloxyethyl)-N-methylamino]-4-(R-3-methylbutyl)sulfonylstilbene |
| NOVM-14 | 4'-[N-(2-methacryloyloxyethyl)-N-methylamino]-4-(R-2-methylbutyl)sulfonylstilbene |
| NOVM-15 | 4'-[N-(6-acryloyloxyethyl)-N-methylamino]-4-(R-2-methylbutyl)sulfonylstilbene |
| NOVM-16 | 4'-[N-(6-methyacyloyloxyethyl)-N-methylamino]-4-(R-2-methylbutyl)sulfonylstilbene |
| NOVM-17 | 4'[-4-acryloyloxy-1-piperidi[y]l-4-(R-2-methyl-butyl)sulfonylstilbene |
| NOVM-18 | 4'[-4-methacryloyloxy-1-piperidyl-4-(R-2-methyl- |

TABLE V-continued

| | |
|---|---|
| | butyl)sulfonylstilbene |
| NOVM-19 | 4'-(2-acryloyloxyathoxy)-4-methylsulfonyl-stilbene |
| NOVM-20 | 4'-(2-methacryloyloxyethoxy)-4-methylsulfonyl-stilbene |
| NOVM-21 | 4'-(6-acryloyloxyhexoxy)-4-methylsulfonyl-stilbene |
| NOVM-22 | 4'-(6-methacryloyloxhexoxy)-4-methylsulfonyl-stilbene |
| NOVM-23 | 4'-(2-acryloyloxyethoxy)-4-phenylsulfonyl-stilbene |
| NOVM-24 | 4'-(2-methacryloyloxyethoxy)-4-phenylsulfonyl-stilbene |
| NOVM-25 | 4'-(6-acryloyloxyhexoxy)-4-phenylsulfonyl-stilbene |
| NOVM-26 | 4'-(6-methacryloyloxyhexoxy)-4-phenylsulfonyl-stilbene |
| NOVM-27 | 4'-(2-acryloyloxyethoxy)-4-(R-2-methylbutyl)-sulfonylstilbene |
| NOVM-28 | 4'-(2-methacryloyloxyethoxy)-4-(R-2-methyl-butyl)sulfonylstilbene |
| NOVM-29 | 4'-(6-acryloyloxyhexoxy)-4-(R-2-methyl-butyl)sulfonylstilbene |
| NOVM-30 | 4'-(6-methacryloyloxyhexoxy)-4-(R-2-methylbutyl)-sulfonylstilbene |
| NOVM-31 | 4'-(2-acryloyloxyathylthio)-4-methyl-sulfonylstilbene |
| NOVM-32 | 4'-(2-methacryloyloxyathylthio)-4-methyl-sulfonylstilbene |
| NOVM-33 | 4'-(6-acryloyloxyhexylthio)-4-methylsulfonyl-stilbene |
| NOVM-34 | 4'-(6-methacryloyloxyhexylthio)-4-methyl-sulfonylstilbene |
| NOVM-35 | 4'-(2-acryloyloxyethylthio)-4-phenylsulfonyl-stilbene |
| NOVM-36 | 4'-(2-methacryloyloxyethylthio)-4-phenyl-sulfonylstilbene |
| NOVM-37 | 4'-(6-acryoyloxyhexylthio)-4-phenylsulfonyl-stilbene |
| NOVM-38 | 4'-(6-methacryloyloxyhexylthio)-4-phenyl-sulfonylstilbene |
| NOVM-39 | 4'-(2-acryloyloxyethylthio)-4-(R-2-methyl-butyl)sulfonylstilbene |
| NOVM-40 | 4'-(2-methacryloyloxyethylthio)-4-(R-2-methyl-butyl)-sulfonylstilbene |
| NOVM-41 | 4'-(6-acryloyloxyhexylthio)-4-(R-2-methyl-butyl)sulfonylstilbene |
| NOVM-42 | 4'-(6-methacryloyloxyhexylthio)-4-(R-2-methylbutyl)sulfonylstilbene |
| NOVM-43 | 4'dimethylamino-4-(6-acryloyloxyhexyl)sulfonyl-stilbene |
| NOVM-44 | 4'dimethylamino-4-(6-methacryloyloxyhexyl)-sulfonylstilbene |
| NOVM-45 | 4'-(1-pyrrolidino)-4-(6-acryloyloxyhexyl)-sulfonylstilbene |
| NOVM-46 | 4'-(1-pyrrolidino)-4-(6-methacryloyloxyhexyl)-sulfonylstilbene |
| NOVM-47 | 4'-[N-(R-2-methylbutyl)-N-methylamino]-4-(6-acryloyloxyhexyl)sulfonylstilbene |
| NOVM-48 | 4'-[N-(R-2-methylbutyl)-N-methylamino]-4-(6-methacryloyloxyhexyl)sulfonylstilbene |
| NOVM-49 | 4'-methoxy-4-(6-acrloyloxyhexyl)sulfonyl-stilbene |
| NOVM-50 | 4'-methoxy-4-(6-methacryloyloxyhexyl)sulfonyl-stilbene |
| NOVM-51 | 4'-(R-2-methylbutoxy)-4-(6-acryloyloxyhexyl)-sulfonylstilbene |
| NOVM-52 | 4'-(R-2-methylbutoxy)-4-(6-methacryloyloxy-hexyl)sulfonylstilbene |
| NOVM-53 | 4'-methylthio-4-(6-acrloyloxyhexyl)sulfonyl-stilbene |
| NOVM-54 | 4'-methylthio-4-(6-methacrloyloxyhexyl)-sulfonylstilbene |
| NOVM-55 | 4'-(R-2-methylbutylthio)-4-(6-acryloyloxy-hexyl)sulfonylstilbene |
| NOVM-56 | 4'-(R-2-methylbutylthio)-4-(6-methacryloyloxy-hexyl)sulfonylstilbene |
| NOVM-57 | 4'-[N-(2-acryloyloxyethyl)-N-methylamino]-4-methyl-sulfonylazobenzene |
| NOVM-58 | 4'-[N-(2-methacryloyloxyethyl)-N-ethylamino]-4-methylsulfonylazobenzene |
| NOVM-59 | 4'-[N-(6-acryloyloxyhexyl)-N-ethylamino]-4-methylsulfonylazobenzene |
| NOVM-60 | 4'-[N-(6-methacryloyloxyhexyl)-N-methylamino]-4-methylsulfonylazobenzene |
| NOVM-61 | 4'[-4-acryloyloxy-1-piperidyl-4-methylsulfonyl-azo-benzene |
| NOVM-62 | 4'[-4-methacryloyloxy-1-piperidyl-4-methyl-sulfonylazo-benzene |
| NOVM-63 | 4'-[N-(2-acryloyloxyethyl)-N-methylamino]-4-phenyl-sulfonylazobenzene |
| NOVM-64 | 4'-[N-(2-methacryloyloxyethyl)-N-methylamino]-4-phenylsulfonylazobenzene |
| NOVM-65 | 4'-[N-(6-acryloyloxyhexyl)-N-methylamino]-4-phenyl-sulfonylazobenzene |
| NOVM-66 | 4'-[N-(6-methacryloyloxyhexyl)-N-methylamino]-4-phenylsulfonylazobenzene |
| NOVM-67 | 4'[-4-acryloyloxy-1-pieridyl-4-phenylsulfonyl-azo-benzene |
| NOVM-68 | 4'[-4-methacryloyloxy-1-piperidyl-4-phenyl-sulfonylazo-benzene |
| NOVM-69 | 4'-[N-(2-acryloyloxyhethyl)-N-methylamino]-4-(R-2-methylbutyl)sulfonylazobenzene |
| NOVM-70 | 4'-[N-(2-methacryloyloxyhethyl)-N-methylamino]-4-(R-2-methylbutyl)sulfonylazobenzene |
| NOVM-71 | 4'-[N-(6-acryloyloxyhexyl)-N-methylamino]-(R-2-methylbutyl)sulfonylazobenzene |
| NOVM-72 | 4'-[N-(6-methacryloyloxyhexyl)-N-methylamino]-4-(R-2-methylbutyl)sulfonylazobenzene |
| NOVM-73 | 4'[-4-acryoyloxy-1-piperidyl-4-(R-2-methylbutyl)-sulfonylazobenzene |
| NOVM-74 | 4'[-4-methacryoyloxy-1-piperidyl-4-(R-2-methylbutyl)sulfonylazobenzene |
| NOVM-75 | 4'-(2-acryloyloxyethoxy)-4-methylsulfonylazo-benzene |
| NOVM-76 | 4'-(2-methacryloyloxyethoxy)-4-methylsulfonylazo-benzene |
| NOVM-77 | 4'-(6-acryoyloxyhexoxy)-4-methylsulfonylazo-benzene |
| NOVM-78 | 4'-(6-methazryloyloxyhexoxy)-4-methylsulfonylazo-benzene |
| NOVM-79 | 4'-(2-acryloyloxyethoxy)-4-phenylsulfonylazo-benzene |
| NOVM-80 | 4'-(2-methacryloyloxyethoxy)-4-phenylsulfonylazo-benzene |
| NOVM-81 | 4'-(6-acryloyloxyhexoxy)-4-phenylsulfonylazo-benzene |
| NOVM-82 | 4'-(6-methacryloyloxyhexoxy)-4-phenylsulfonylazo-benzene |
| NOVM-83 | 4'-(2-acryloyloxyethoxy)'-4-(R-2-methylbutyl)-sulfonylazobenzene |
| NOVM-84 | 4'-(2-methacryloyloxyethoxy)-4-(R-2-methylbutyl)-sulfonylazobenzene |
| NOVM-85 | 4'-(6-acryloyloxyhexoxy)-4-(R-2-methylbutyl)-sulfonylazobenzene |
| NOVM-86 | 4'-(6-methacryloyloxyhexoxy)-4-(R-2-methylbutyl)-sulfonylazobenzene |
| NOVM-87 | 4'-(2-acryloyloxyethylthio)-4-methylsulfonylazo-benzene |
| NOVM-88 | 4'-(2-methacryloyloxyethylthio)-4-methylsulfonyl-azo-benzene |
| NOVM-89 | 4'-(6-acryloyloxyhexylthio)-4-methylsulfonylazo-benzene |
| NOVM-90 | 4'-(6-methacryloyloxyhexylthio)-4-methylsulfonyl-azo-benzene |
| NOVM-91 | 4'-(2-acryloyloxyethylthio)-4-phenylsulfonylazo-benzene |
| NOVM-92 | 4'-(2-methacryloyloxyethylthio)-4-phenylsulfonyl-azo-benzene |
| NOVM-93 | 4'-(6-acryloyloxyhexylthio)-4-phenylsulfonylazo-benzene |
| NOVM-94 | 4'-(6-methacryloyloxyhexlthio)-4-phenylsulfonyl-azo-benzene |
| NOVM-95 | 4'(2-acryloyloxyethylthio)-4-(R-2-methylbutyl)-sulfonylazobenzene |
| NOVM-96 | 4'(2-methacryloyloxyethylthio)-4-(R-2-methyl-butyl)-sulfonylazobenzene |
| NOVM-97 | 4'-(6-acryloyloxyhexylthio)-4-(R-2-methylbutyl)- |

TABLE V-continued

| | |
|---|---|
| | sulfonylazobenzene |
| NOVM-98 | 4'-(6-methacryloyloxyhexylthio)-4-(R-2-methyl-butyl)sulfonylazobenzene |
| NOVM-99 | 4'-dimethylamino-4-(2-acryloyloxyethyl)sulfonyl-azo-benzene |
| NOVM-100 | 4'-dimethylamino-4-(2-methacryloyloxyethyl)-sulfonylazobenzene |
| NOVM-101 | 4'-dimethylamino-4-(6-acryloyloxyhexyl)sulfonyl-azo-benzene |
| NOVM-102 | 4'-dimethylamino-4-(6-methacryloyloxyhexyl)-sulfonylazobenzene |
| NOVM-103 | 4'-(1-pyrrolidino)-4-(2-acryloyloxyethyl)-sulfonylazobenzene |
| NOVM-104 | 4'-(1-pyrrolidino)-4-(2-methacryloyloxyethyl)-sulfonylazobenzene |
| NOVM-105 | 4'-(1-pyrrolidino)-4-(6-acryloyloxyhexyl)-sulfonylazobenzene |
| NOVM-106 | 4'-(1-pyrrolidino)-4-(6-methacryloyloxyhexyl)-sulfonylazobenzene |
| NOVM-107 | 4'-dimethylamino-4-(6-acryloyloxyhexyl)-sulfonylazobenzene |
| NOVM-108 | 4'-dimethylamino-4-(6-methacryloyloxyhexyl)-sulfonylazobenzene |
| NOVM-109 | 4'-(1-pyrrolidino)-4-(6-acryloyloxyhexyl)-sulfonylazobenzene |
| NOVM-110 | 4'-(1-pyrrolidino)-4-(6-methacryloyloxyhexyl)-sulfonylazobenzene |
| NOVM-111 | 4'[N-(R-2-methylbutyl)-N-methylamino]-4-(6-acryloyloxyhexyl)sulfonylazobenzene |
| NOVM-112 | 4'[N-(R-2-methylbutyl)-N-methylamino]-4-(6-methacryloyloxyhexyl)sulfonylazobenzene |
| NOVM-113 | 4'-methoxy-4-(6-acryloyloxyhexyl)sulfonylazo-benzene |
| NOVM-114 | 4'-methoxy-4-(6-methacryloyloxyhexyl)sulfonylazo-benzene |
| NOVM-115 | 4'-(R-2-methylbutoxy)-4-(6-acryloyloxyhexyl)-sulfonylazobenzene |
| NOVM-116 | 4'-(R-2-methylbutoxy)-4-(6-methacryloyloxyhexyl)-sulfonylazobenzene |
| NOVM-117 | 4'-methylthio-4-(6-acryloxyhexyl)-sulfonylazo-benzene |
| NOVM-118 | 4'-methylthio-4-(6-methacryloxyhexyl)-sulfonyl-azo-benzene |
| NOVM-119 | 4'-(R-2-methylbutylthio)-4-(6-acryloxyhexyl)-sulfonylazobenzene |
| NOVM-120 | 4'-(R-2-methylbutylthio)-4-(6-acryloxyhexyl)-sulfonylazobenzene |
| NOVM-121 | [-4-(6-acryloyloxyhexylsulfonyl)phenyl]ethylene |
| NOVM-122 | [-4-(6-methacryloyloxyhexylsulfonyl)phenyl]-diimine |

The following are illustrative of typical vinyl addition monomers that can be copolymerized with the vinyl molecular dipole monomers of Table V, if desired. The vinyl molecular dipole monomers can form 50–100% of the repeating units of the polymer, with vinyl additionmonomers, such as those of Table VI below, forming the balance of the repeating units of the polymer.

TABLE VI

| | |
|---|---|
| VCOM-1 | Methyl acrylate |
| VCOM-2 | Ethyl acrylate |
| VCOM-3 | Butyl acrylate |
| VCOM-4 | t-Butyl acrylate |
| VCOM-5 | Methyl chloroacrylate |
| VCOM-6 | Methyl methacrylate |
| VCOM-7 | Ethyl methacrylate |
| VCOM-8 | Butyl methacrylate |
| VCOM-9 | t-Butyl methacrylate |
| VCOM-10 | Styrene |
| VCOM-11 | 4-Methylstyrene |
| VCOM-12 | α-Methylstyrene |
| VCOM-13 | 4-t-Betylstyrene |
| VCOM-14 | 4-Hydroxystyrene |
| VCOM-15 | 4-Methoxystyrene |
| VCOM-16 | 4-Acetoxystyrene |

TABLE VI-continued

| | |
|---|---|
| VCOM-17 | 2-Vinylnaphthylene |
| VCOM-18 | Acrylonitrile |
| VCOM-19 | Acrylamide |
| VCOM-20 | N-Phenylmaleimide |
| VCOM-21 | N-Vinylpyrrolidone |
| VCOM-22 | Vinylacetate |
| VCOM-23 | Vinylchloride |
| VCOM-24 | Butadiene |
| VCOM-25 | Isoprene |
| VCOM-26 | Chloroprene |

Conventional details of device fabrication are also taught by the foregoing NLO citations.

While the invention has been described with particular reference to acrylates other polymeric systems may be utilized for the (b) component such as the aromatic compounds referred to herein.

In addition, polyesters, polyurethanes, polyamides, polyethers and polycarbonates may be utilized for the (b) component.

Metal alkoxides that are useful include, in addition to the alkoxysilanes referred to, titanium butoxide, titanium isopropoxide, aluminum sec-butoxide, aluminum iso-propoxide, zirconium butoxide, zirconium ethoxide triethylphosphate and trimethylphosphate. Further, it should be noted that metal carboxylates such as silicon tertraacetate and titanium 2-ethylhexanoate and metal halides such as silicon tetrachloride and tin tetrachloride.

Buffer layers produced in accordance with the invention have the advantage that they can be spin coated both above and below the nonlinear organic polymer film using solvents which do not dissolve the nonlinear organic polymer film. Additionally, nonlinear organic polymer films can be fabricated using solvents which do not dissolve or damage the buffer layer. Further, buffer layers produced using hydrolysis and condensation of the metal alkoxide have a greater resistance to solvents used to dissolve and coat the nonlinear organic polymer film, thereby providing greater latitude in producing such films. Another advantage is that the buffer layers can be coated to thicknesses up to and in excess of 3–5 microns. Further, such buffer layers are transparent through the visible and near infrared spectrum. Also, such buffer layers are highly amorphous and have low light scattering losses. The use of these buffer layers on both sides of an nonlinear organic film results in unexpected field drops across the nonlinear organic film which translates to higher than expected electrooptic coefficients.

The following specific examples are still further illustrative of the invention.

EXAMPLE 1

An indium tin oxide (ITO) coated glass plate was placed on a vacuum chuck for spin coating. The following first solution was prepared for spin coating. To 5 ml of propylene glycol monomethyl ether acetate (PGMEA) was added 0.5 gm of polymethylmethacrylate (PMMA). To this solution was added 0.25 gm of tetraethoxysilane (TEOS) and 0.07 gm of 0.1N HCl. The solution was stirred until clear. The solution was then filtered through a 0.5 micron Millipore TM filter. Thereafter, the solution was placed on the indium tin oxide layer and the glass plate spun at 1000 RPM. The resulting film was then placed in a vacuum oven at 120° C. overnight.

A second solution was prepared for spin coating. The second solution was prepared as follows: to 10 ml of trichloropropane (TCP) was added 1.75 gm of polymer A. The solution was filtered through a 0.2 micron Millipore filter. Then this second solution was placed on the coating prepared from the first solution. The coated glass plate was spun at 1000 RPM and baked overnight in a vacuum oven at 110° C. A third solution was prepared and coated on the layer resulting from the second solution. The third solution was prepared as follows: to 5 ml of PGMEA was added 0.4 gm of PMMA. To this solution was added 0.245 gm TEOS and 0.07 gm of 0.1N HCl. The solution was filtered through a 0.5 micron Millipore filter, coated on the coating resulting from the second solution and spun at 1000 RPM. The resulting three layer film was then baked overnight in the vacuum oven at 110° C.

A 1000 Angstrom thick coating of gold was then applied. The final form of the device with the thickness of each layer is as follows:

| | |
|---|---|
| gold layer | (1000Å) |
| PMMA/SiO$_2$ | (1.71 μm) |
| nonlinear organic film | (1.14 μm) |
| PMMA/SiO$_2$ | (1.02 μm) |
| indium tin oxide | (2000Å) |
| glass support | |

For purposes of aligning dipoles in the three layer structure a voltage of 397 volts was applied across the device from the gold layer to indium tin oxide layer while heating to a temperature of 117° C. The device with the voltage applied was held to this temperature for 30 minutes and then allowed to cool to room temperature with the voltage still applied. The voltage was then removed leaving the dipoles aligned. The electrooptic (EO) coefficient of the film was measured at 830 nm and found to be 14 pm/v.

EXAMPLE 2

Another three layer film was prepared using just PMMA as the first and third layers. The same solutions as in example 1 were used except no TEOS was used. The electrooptic coefficient of the film was found to be 2 pm/v.

Polymer A has the following structure:

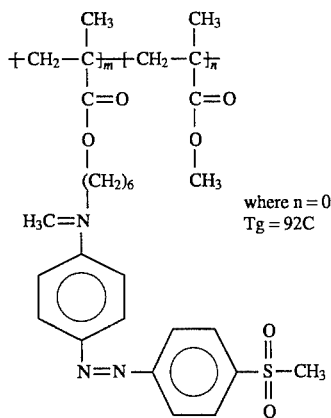

These results show that the resistance of the two outer layers increases significantly with the addition of the SiO$_2$ resulting in the surprising seven fold increase in the electrooptic coefficient.

The invention has been described in detail with particular reference to certain preferred embodiments thereof, but it will be understood that variations and modifications can be effected within the spirit and scope of the invention.

PARTS LIST 100 optical article
101 electrically conductive support
103 transmission enhancement layer
105 poled polymeric film
107 prism
109 prism
200 optical article
201 electrically insulative support
203 transmission enhancement layer
205 polymeric film
207 prism
209 prism
213 buffer layer
215 poling electrode

We claim:

1. In an optical article including an electrically conductive support, a poled polymeric film located on the support exhibiting a glass transition temperature of at least 50° C. and a second order polarization susceptibility greater than $10^{-9}$ electrostatic units, and a transmission enhancement layer interposed between the conductive support and the polymeric film, the improvement comprising:

(a) said transmission enhancement layer being capable of deflecting light and propagating it within the layer including a polymer phase having dispersed therein an interwoven network second phase of crosslinked metal oxide having the form —M—O—M— wherein M is a metal atom and O is oxygen, the second phase formed by hydrolysis and condensation of metal alkoxide, the layer being transparent in the visible and near infrared wavelengths, the arrangement being such that light coupled into the layer will propagate within the layer;

(b) means for coupling light into the layer so that it propagates within the layer; and (c) means for receiving propagated light from the layer for directing it outside the article.

2. The optical article in accordance with claim 1 wherein the metal oxide is selected from the group consisting of SiO$_2$, TiO$_2$, Al$_2$O$_3$, ZrO and P$_2$O$_3$.

3. The optical article in accordance with claim 1 wherein the —M—O—M— is —Si—O—Si—.

4. The optical article accordance with claim 1 wherein the layer has a thickness in the range of 2 to 7 micrometers.

5. The optical article in accordance with claim 1 wherein the layer has a thickness in the range of 3 to 5 micrometers.

6. The optical article in accordance with claim 1 wherein the polymer is selected from the group consisting of polyesters, polyurethanes, polyamides, polyesters, polycarbonates and acrylic polymers.

7. The optical article in accordance with claim 1 wherein the layer is amorphous to produce low light scattering losses.

8. The optical article in accordance with claim 1 wherein the layer provided on said nonlinear optical article produces an electrooptic coefficient of at least 5 pm/V.

9. The optical article in accordance with claim 1 wherein the layer provided on said nonlinear optical article produces an electrooptic coefficient in the range of 10 to 20 pm/V.

10. In an optical article for the propagation of electromagetic radiation comprised of:

an electrical conductive support,
a poled polymeric film located on said support exhibiting a glass transition temperature of at least 50° C. and a second order polarization susceptibility greater than $10^{-9}$ electrostatic units, and a transmission enhancement layer comprising an amorphous layer interposed between said conductive support and said polymeric film, the improvement wherein said transmission enhancement layer comprises:

a polymer phase having dispersed therein an interwoven network second phase of crosslinked metal oxide having the form —M—O—M— wherein M is a metal atom and O is oxygen, the second phase formed by hydrolysis and condensation of metal alkoxide, the layer being transparent in the visible and near infrared wavelengths.

11. The optical article layer in accordance with claim 10 wherein the metal oxide is selected from $SiO_2$, $TiO_2$, $Al_2O_3$, ZrO or $P_2O_3$.

12. The optical article layer in accordance with claim 10 wherein the —M—O—M— is —Si—O—Si—.

13. The optical article in accordance with claim 10 wherein the layer has a thickness in the range of 2 to 7 micrometers.

14. The optical article in accordance with claim 10 wherein the layer has a thickness in the range of 3 to 5 micrometers.

15. The optical article in accordance with claim 10 wherein the polymer is selected from the group consisting of polyesters, polyurethanes, polyamides, polyethers, polycarbonates or acrylic polymers.

16. The optical article in accordance with claim 10 wherein the layer produces an electrooptic coefficient of at least 5 pm/V.

17. The optical article in accordance with claim 10 wherein the layer has an electrooptic coefficient in the range of 10 to 20 pm/V.

* * * * *